United States Patent
Yoshio et al.

(10) Patent No.: US 8,724,293 B2
(45) Date of Patent: May 13, 2014

(54) STORAGE DEVICE

(75) Inventors: Masaki Yoshio, Saga (JP); Toshihiko Kawamura, Yokkaichi (JP); Nariaki Moriyama, Yokkaichi (JP); Masatoshi Honma, Yokkaichi (JP); Tokuo Suita, Kusatsu (JP); Hirofumi Taniguchi, Yokkaichi (JP); Tomoyuki Sotokawa, Kusatsu (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 414 days.

(21) Appl. No.: 12/311,824

(22) PCT Filed: Oct. 19, 2007

(86) PCT No.: PCT/JP2007/070418
§ 371 (c)(1),
(2), (4) Date: Apr. 28, 2009

(87) PCT Pub. No.: WO2008/047898
PCT Pub. Date: Apr. 24, 2008

(65) Prior Publication Data
US 2010/0046143 A1 Feb. 25, 2010

(30) Foreign Application Priority Data
Oct. 20, 2006 (JP) ................. 2006-285796

(51) Int. Cl.
*H01G 9/00* (2006.01)
*H01M 8/04* (2006.01)

(52) U.S. Cl.
USPC ................... 361/502; 361/503; 429/231.5

(58) Field of Classification Search
USPC .................. 361/523, 502; 429/231.5
See application file for complete search history.

(56) References Cited

U.S. PATENT DOCUMENTS

| | | | |
|---|---|---|---|
| 7,585,488 B2 * | 9/2009 | Sakai | 423/613 |
| 7,662,515 B2 * | 2/2010 | Inagaki et al. | 429/231.95 |
| 2002/0008956 A1 * | 1/2002 | Niu | 361/502 |
| 2004/0076884 A1 | 4/2004 | Lee et al. | |
| 2005/0058907 A1 * | 3/2005 | Kurihara et al. | 429/232 |
| 2006/0216601 A1 * | 9/2006 | Komiyama et al. | 429/231.1 |
| 2007/0009801 A1 | 1/2007 | Inagaki et al. | |

FOREIGN PATENT DOCUMENTS

| | | |
|---|---|---|
| CN | 1095191 A | 11/1994 |
| JP | 60-249247 A | 12/1985 |
| JP | B-2-8420 | 12/1985 |
| JP | A-7-57780 | 3/1995 |

(Continued)

OTHER PUBLICATIONS

Kavan, L. et al. "Nanocrystalline TiO$_2$ (Anatase)... Electrochemical Properties," J. Electrochemical Soc., V. 143, No. 2, Feb. 1996, pp. 394-400.

*Primary Examiner* — Eric Thomas
*Assistant Examiner* — Arun Ramaswamy
(74) *Attorney, Agent, or Firm* — Paul E White, Jr.; Manelli Selter PLLC

(57) ABSTRACT

Disclosed is a storage device comprising a positive electrode material containing graphite; a negative electrode material containing an oxide of at least one metal element selected from Ti, Zr, V, Cr, Mo, Mn, Fe, Co, Ni, Cu, Zn, Sn, Sb, Bi, W and Ta, which may preferably contains a metal oxide containing at least Ti as a metal element; and an electrolyte solution. This storage device has high capacitance and high discharge voltage, thereby having high energy. Consequently, this storage device can have high energy density, while being excellent in cycle performances and rate performances.

20 Claims, 6 Drawing Sheets

(56) References Cited

FOREIGN PATENT DOCUMENTS

| | | |
|---|---|---|
| JP | 2005-191507 | 7/2005 |
| JP | A-2005-294780 | 10/2005 |
| JP | 2005-332852 | 12/2005 |
| JP | 2006278234 A * | 10/2006 |
| JP | 2006352094 A * | 12/2006 |
| JP | A-2007-305625 | 11/2007 |
| TW | 563266 | 11/2003 |
| TW | 200527457 | 8/2005 |
| WO | WO 2004/034491 A1 | 4/2004 |
| WO | WO 2006/033069 A2 | 3/2006 |

* cited by examiner

STORAGE DEVICE

TECHNICAL FIELD

The present invention relates to a storage device having high capacitance.

BACKGROUND ART

As storage devices mainly composed of a positive electrode, a negative electrode and a non-aqueous electrolyte, various constructions have been proposed, and they have been practically used for electric sources of mobile apparatuses, storage systems for regeneration, backup electric sources of personal computers, etc. Among them, electric double-layer capacitors in which graphite is used as positive electrode material and a carbonaceous material is used as negative electrode material are superior, in capacitance and dielectric strength, to conventional storage devices using activated carbon for electrode (see Patent Document 1).
Patent Document 1: JP-A-2005-294780

DISCLOSURE OF INVENTION

Problem to be Solved by the Invention

The double-layer storage devices disclosed in Patent Document 1 are superior in capacitance and dielectric strength as mentioned above, but storage devices having higher capacitance are demanded.

Means for Solving the Problem

As a result of intensive research conducted by the inventors in an attempt to solve the above problems, it has been found that a storage device comprising a positive electrode material containing graphite, a negative electrode material containing a specific metal oxide and an electrolyte is high in capacitance and excellent in stability and safety. Thus, the present invention has been accomplished.

That is, the present invention relates to a storage device comprising a positive electrode material containing graphite, a negative electrode material containing an oxide of at least one metal element selected from Ti, Zr, V, Cr, Mo, Mn, Fe, Co, Ni, Cu, Zn, Sn, Sb, Bi, W and Ta, and an electrolyte.

Advantages of the Invention

Since the storage device of the present invention uses a negative electrode material containing a specific metal oxide, it has a high capacitance. By using a positive electrode material containing graphite, the storage device can be charged and discharged at higher voltage, and can have high energy density. Particularly, in the present invention, high current input and output can be attained by using graphite as a positive electrode and a specific metal oxide as a negative electrode.

BEST MODE FOR CARRYING OUT THE INVENTION

The storage device of the present invention is characterized by comprising a positive electrode material containing graphite, a negative electrode material containing an oxide of at least one metal element selected from Ti, Zr, V, Cr, Mo, Mn, Fe, Co, Ni, Cu, Zn, Sn, Sb, Bi, W and Ta, and an electrolyte.

In the present invention, an oxide of at least one metal element selected from Ti, Zr, V, Cr, Mo, Mn, Fe, Co, Ni, Cu, Zn, Sn, Sb, Bi, W and Ta is used as a negative electrode material. The oxide of the above metal element is preferably a metal oxide containing at least titanium because it gives high capacitance. In the case of using an electrolyte containing a lithium salt, when oxidation-reduction potential of lithium is 0 V, oxidation-reduction potential of metal oxide containing at least titanium is about 1-2 V, which is sufficiently higher than that of lithium, and, therefore, deposition of metallic lithium on the negative electrode is inhibited, resulting in high safety. The oxide is more preferably titanium oxide or a composite oxide of titanium and alkali metal or alkaline earth metal element. Examples of the composite oxide are lithium titanate, calcium titanate, barium titanate, strontium titanate, layered alkali metal titanates represented by $M_2Ti_3O_7$ (M denotes an alkali metal), etc. The particle shape of them is not particularly limited and may be any of isotropic shapes such as spherical shape and polyhedral shape, and anisotropic shapes such as rod-like shape, fibrous shape and flaky shape. Furthermore, as far as the effects of the present invention are not damaged, there may be used the above oxides doped with other different metals or the above oxides which are surface treated with inorganic materials such as silica and alumina or organic materials such as surface active agent and coupling agents.

Of these metal oxides, titanium oxides have stable crystal lattice and are more preferred. The titanium oxides in the present invention are compounds of titanium and oxygen, which include hydrogen-containing compounds, hydrous compounds and hydrates. As these titanium oxides, mention may be made of, for example, titanium oxides (titanium dioxide, dititanium trioxide, titanium monoxide, etc.), titanic acid compounds (titanium dihydrogentrioxide (metatitanic acid), titanium tetrahydrogentrioxide (orthotitanic acid), layered titanic acid compounds represented by $H_2Ti_3O_7$, $H_{4x/3}Ti_{(2-x)/3}O_4$ (x=0.50-1.0), etc.), titanium hydroxides (titanium tetrahydroxide, etc.), and the like. The particle diameter of the titanium oxides is not particularly limited, and those having a particle diameter in the range of 0.1-500 $m^2/g$ in terms of specific surface area are preferred for attaining high current inputting and outputting.

In the present invention, there may be used titanium oxides having any crystal forms such as rutile type, brookite type, anatase type, bronze type, hollandite type and ramsdellite type or amorphous titanium oxides, and anatase type and/or rutile type titanium oxides are further superior to other titanium oxides in capacitance and are preferred. Particularly, in the case of anatase type titanium oxides, those which have a specific surface area of 5-500 $m^2/g$ are preferred, and those which have a specific surface area of 5-350 $m^2/g$ are more preferred. In the case of rutile type titanium oxides, those which have a specific surface area of 50-500 $m^2/g$ are preferred, and those which have a specific surface area of 50-350 $m^2/g$ are more preferred.

Alternatively, titanium oxides obtained by heating layered titanic acid compounds can also be used. Specifically, mention may be made of titanium oxides disclosed in Japanese Patent Application No. 2007-221311 or Japanese Patent Application No. 2007-223722. That is, the titanium oxides disclosed in Japanese Patent Application No. 2007-221311 are obtained by heating and firing layered titanic acid compounds represented by $H_2Ti_3O_7$ at a temperature of 200-350° C., preferably higher than 260° C. and lower than 300° C., and the titanium oxides disclosed in Japanese Patent Application No. 2007-223722 are obtained by heating and firing layered titanic acid compounds represented by $H_{4x/3}Ti_{(2-x)/3}O_4$ (x=0.50-1.0) at 250-450° C.

The titanium oxide can be used in the form of secondary particles obtained by aggregation of primary particles. The secondary particles in the present invention are in such a state that primary particles are strongly bonded to each other, and not in such a state that primary particles agglomerate by interaction between particles such as van der Waals' forces or are mechanically compacted, and they do not easily disintegrate by industrial operations such as usual mixing, crushing, filtration, water washing, carrying, weighing, bagging, and accumulation and remain mostly as secondary particles. The voids of the secondary particles are preferably 0.005-1.0 cm$^3$/g, more preferably 0.05-1.0 cm$^3$/g from the point of cell characteristics. The average particle diameter of the secondary particles (50% median diameter measured by laser scattering method) is preferably 0.5-100 μm in making electrodes.

The average particle diameter of primary particles (50% median diameter measured by electron microscope method) is 1-500 nm for easy obtainment of desired voids, and is more preferably 1-100 nm. The specific surface area is not particularly limited, and is preferably 0.1-200 m$^2$/g, and more preferably 3-200 m$^2$/g. Particle shape is also not limited, and there may be used particles of various shapes such as isotropic and anisotropic shapes.

Furthermore, in the present invention, there may be used titanium oxides having flaky particle shape. The flaky particles include those which are generally called plate shape, sheet shape and flake shape. The size of flaky particles is preferably 1-100 nm in thickness and 0.1-500 μm in width and length. Moreover, there may also be used fine flaky particles called nano-sheet, which is preferably 0.5-100 nm in thickness and 0.1-30 μm in width and length, more preferably 0.5-10 nm in thickness and 1-10 μm in width and length.

Next, graphite used for the positive electrode material is not particularly limited. The graphite in the present invention means one which has a $d_{(002)}$ of 0.335-0.344 nm obtained from the peak position of 002 plane in X-ray diffraction. Particularly, the graphite has a specific surface area of preferably 0.5-300 m$^2$/g, more preferably 5-100 m$^2$/g.

As the electrolyte in which the positive electrode and negative electrode are immersed, there may be used, for example, a solution obtained by dissolving a solute in a non-aqueous solvent. As anions which act in the electrolyte, mention may be made of, for example, at least one anion selected from the group consisting of tetrafluoroborate ion ($BF_4^-$), hexafluorophosphate ion ($PF_6^-$), perchlorate ion ($ClO_4^-$), hexafluoroarsenate ($AsF_6^-$), hexafluoroantimonate ($SbF_6^-$), perfluoromethylsulfonyl ($CF_3SO_2^-$) and perfluoromethylsulfonate ($CF_3SO_3^-$).

As cations, mention may be made of, for example, those which are selected from the group consisting of symmetric or asymmetric quaternary ammonium ions, imidazolium derivative ions such as ethylmethylimidazolium and spiro-(1,1') bipyrrolidinium, and lithium ion. Among them, those which contain lithium ion are preferred.

As the non-aqueous solvents, there may be used at least one solvent selected from the group consisting of tetrahydrofuran (THF), methyltetrahydrofuran (MeTHF), methylformamide, methyl acetate, diethyl carbonate, dimethyl ether (DME), carbonic acid esters such as propylene carbonate (PC), γ-butyllactone (GBL), dimethyl carbonate (DMC), diethyl carbonate (DEC), ethylene carbonate (EC) and ethyl methyl carbonate (EMC), acetonitrile (AN), sulfolane (SL), and these non-aqueous solvents containing fluorine in a part of molecules.

The storage device of the present invention comprises the above positive electrode, negative electrode, electrolyte and separator, and examples thereof are electrochemical capacitors, hybrid capacitors, redox capacitors, electric double-layer capacitors, lithium batteries, etc. The positive electrode and negative electrode are obtained by adding a conductive material such as carbon black, acetylene black or Ketzen black, and a binder such as fluorocarbon resin or water-soluble rubber resin to the positive electrode material and the negative electrode material, and optionally molding or coating the mixture. As the separator, porous polyethylene film, polypropylene film, or the like is used.

EXAMPLES

Examples of the present invention will be shown below, which should not be construed as limiting the invention.

Example 1

(Production of Positive Electrode)

Graphite (1) having a $d_{(002)}$ of 0.3371 nm obtained by X-ray diffraction and a mixed powder of acetylene black and polytetrafluoroethylene resin (trade name: TAB manufactured by The Bulgarian Central Laboratory of Electrochemical Power Source Co., Ltd.) were mixed at a weight ratio of 3:1, followed by kneading the mixture using an agate mortar and shaping into a circle of 10 mm in diameter to obtain a pellet. The pellet had a weight of 10 mg. On this pellet was superposed an aluminum mesh cut out into a circle of 10 mm in diameter as a collector, followed by pressing them under 9 MPa to obtain a positive electrode (1).

(Production of Negative Electrode)

Anatase type titanium dioxide having a specific surface area of 314 m$^2$/g, acetylene black and polytetrafluoroethylene resin were mixed at a weight ratio of 5:4:1, followed by kneading the mixture using an agate mortar and shaping into a circle of 10 mm in diameter to obtain a pellet. The pellet had a weight of 15 mg. On this pellet was superposed a copper foil cut out into a circle of 10 mm in diameter as a collector to obtain a negative electrode (1).

(Fabrication of Storage Device)

The above positive electrode (1) and negative electrode (1) were vacuum dried at 200° C. for 4 hours, and then were incorporated in a closable coin-shaped cell for testing in a glove box having a dew point of −70° C. or lower. The cell was made of stainless steel (SUS316) and had an outer diameter of 20 mm and a height of 3.2 mm. The positive electrode (1) with the collector being underneath was placed in a bottom can of the evaluation cell, a porous polypropylene film as a separator was placed on the positive electrode, and from above was dropped a mixed solution of ethylene carbonate and ethyl methyl carbonate (mixed at 3:7 in volume ratio) in which LiPF$_6$ was dissolved at a concentration of 1 mole/liter as a non-aqueous electrolyte. Thereon were placed the negative electrode (1), and a spacer of 0.5 mm thick for adjustment of thickness and a spring (both made of SUS 316) with the collector being on the upper side. Then, a top can provided with a polypropylene gasket was put thereon to seal them hermetically by caulking outer peripheral part, thereby obtaining a storage device of the present invention (Sample A).

Examples 2-6

Storage devices of the present invention (Samples B-F) were obtained in the same manner as in Example 1, except that titanium oxides shown in Table 1 were used in place of the anatase type titanium dioxide having a specific surface area of 314 m$^2$/g.

Example 7

20.0 g of commercially available rutile type high-purity titanium dioxide (PT-301 manufactured by Ishihara Sangyo Kaisha, Ltd.) and 8.85 g of sodium carbonate were mixed, and the mixture was heated and fired at 800° C. for 20 hours in the air using an electric furnace, followed by again heating and firing under the same conditions as above to obtain layered sodium titanate having a composition of $Na_2Ti_3O_7$. The resulting layered sodium titanate was added to an aqueous hydrochloric acid solution having a concentration of 1 mole at a concentration of 10 g/liter, and reaction was effected for 4 days. When the reaction product was analyzed, substantially no sodium was contained, and hence it was confirmed that there was obtained a layered titanic acid compound in which sodium and hydrogen were nearly completely replaced with each other and had a composition of $H_2Ti_3O_7$. During the reaction, the aqueous hydrochloric acid solution was renewed every one day. The resulting layered titanic acid compound was subjected to filtration, washing and solid-liquid separation, followed by drying at 60° C. for 12 hours in the air and then heating at 280° C. for 20 hours in the air using an electric furnace to obtain a titanium oxide (Sample g). Heating loss of Sample g was measured in the temperature range of 300-600° C. using a balance for differential thermal analysis to find a heating loss of 1.0% by weight. When this heating loss was presumed to result from water of crystallization contained in the titanium oxide, the sample was considered to be a titanic acid compound having a composition of $H_2Ti_{22}O_{45}$. Furthermore, X-ray diffraction pattern of Sample g measured using Cu—Kα line as a line source showed a pattern similar to that of bronze type titanium dioxide shown in JCPDS card 35-088 or the like. However, in the case of bronze type titanium dioxide, two peaks of (001) plane and (200) plane are observed around 15° of angle of diffraction (2θ), but in the case of Sample h, spacing of the two peaks was 0 or they were very close. X-ray diffraction pattern of Sample g is shown in FIG. 1. A storage device of the present invention (Sample G) was obtained in the same manner as in Example 1, except that Sample g was used as the titanium oxide.

Example 8

Potassium carbonate, lithium carbonate and rutile type titanium dioxide obtained by neutralization and hydrolysis of titanium tetrachloride as titanium oxide were mixed at a molar ratio of K/Li/Ti of 3/1/6.5 and the mixture was sufficiently ground. The ground product was transferred to a platinum crucible and fired at 800° C. for 5 hours in the air using an electric furnace to obtain layered lithium potassium titanate having a composition of $K_{0.8}Li_{0.27}Ti_{1.73}O_4$. One gram of the resulting layered lithium potassium titanate was reacted with 100 cm$^3$ of 1N hydrochloric acid while stirring at room temperature for 1 day. The reaction product was analyzed to find that substantially no lithium and potassium were contained, and hence it was confirmed that there was obtained a layered titanic acid compound in which lithium and potassium were nearly completely replaced with hydrogen and which had a composition of $H_{1.07}Ti_{1.73}O_4$. The resulting layered titanic acid compound was filtered, washed with water and dried, and then heated at 400° C. for 20 hours in the air to obtain a titanium oxide (Sample h). Heating loss of Sample h was measured in the temperature range of 300-600° C. to obtain a heating loss of 0.12% by weight. When this heating loss was presumed as in Example 7, the sample was considered to have a composition of $H_2Ti_{189}O_{379}$ and to be nearly a titanium dioxide ($TiO_2$). Furthermore, X-ray diffraction pattern of Sample h measured using Cu—Kα line as a line source showed a pattern similar to that of bronze type titanium dioxide shown in JCPDS card 35-088 or the like. However, in the case of bronze type titanium dioxide, two peaks of (003) plane and (−601) plane are observed around 44° of angle of diffraction (2θ), but in the case of Sample h, spacing of the two peaks was 0 or they were very close. X-ray diffraction pattern of Sample h is shown in FIG. 2. A storage device of the present invention (Sample H) was obtained in the same manner as in Example 1, except that this titanium dioxide was used as the titanium oxide.

Example 9

The layered titanic acid compound having a composition of $H_{1.07}Ti_{1.73}O_4$ obtained in Example 8 in an amount corresponding to 0.4 g in terms of $TiO_2$ was added to 100 cm$^3$ of an aqueous solution in which was dissolved tetrabutylammonium hydroxide in an amount of 1 neutralization equivalent to the amount of H$^+$ in the layered titanic acid compound, followed by shaking with a shaker at about 150 times/min for 10 days to peel off layered titanic acid and obtain an anatase type flaky titanium dioxide. This was subjected to measurement with a scanning probe microscope to find that width and length were about 0.2-1.0 μm and the maximum thickness was about 1.5 nm. A storage device of the present invention (Sample I) was obtained in the same manner as in Example 1, except that this flaky titanium dioxide was used as the titanium oxide.

Example 10

The anatase type titanium dioxide having a specific surface area of 314 m$^2$/g used in Example 1 was dispersed in pure water using a juice mixer to prepare a slurry, and to the slurry was added an aqueous solution of polyvinyl alcohol (POVAL PVA-204 manufactured by Kuraray Co., Ltd.) in an amount corresponding to 5% by weight based on the above water-containing titanium oxide in terms of $TiO_2$, followed by further adding pure water to adjust to a concentration of 10% by weight in terms of $TiO_2$. This slurry was spray dried using a four-fluid nozzle type spray dryer (MDL-050B type manufactured by Fujisaki Electric Co., Ltd.) under the conditions of an inlet temperature of 200° C., an outlet temperature of 80° C., and an air discharge amount of 80 liters/min, thereby obtaining secondary particles. The resulting secondary particles were heated and fired at 500° C. for 3 hours in the air, and then the heating and firing product was again slurried with pure water, and subjected to filtration, washing, solid-liquid separation, screening and drying to obtain secondary particles of anatase type titanium dioxide. The secondary particles had an average primary particle diameter (50% diameter based on volume according to electron microscope method) of 7 nm, an average secondary particle diameter (50% diameter based on volume according to laser scattering method) of 9.2 nm, and voids were 0.552 cm$^3$/g. A storage device of the present invention (Sample J) was obtained in the same manner as in Example 1, except that the above secondary particles were used as the titanium oxide.

Example 11

A storage device of the present invention (Sample K) was obtained in the same manner as in Example 1, except that the layered titanic acid compound having a composition of $H_2Ti_3O_7$ obtained in Example 7 was used as negative electrode active material in place of the anatase type titanium dioxide having a specific surface area of 314 m²/g.

Example 12

A storage device of the present invention (Sample L) was obtained in the same manner as in Example 1, except that the layered sodium titanate having a composition of $Na_2Ti_3O_7$ obtained in Example 7 was used as a composite oxide containing titanium and alkali metal in place of the anatase type titanium dioxide having a specific surface area of 314 m²/g, and weight of the pellet was changed to 60 mg.

Examples 13-20

Storage devices of the present invention (Samples M-T) were obtained in the same manner as in Example 1, except that graphite (2) having a $d_{(002)}$ of 0.3368 obtained by X-ray diffraction or graphite (3) having a $d_{(002)}$ of 0.3363 obtained by X-ray diffraction was used in place of graphite (1) used in Examples 1-3 and 10.

Comparative Example 1

A comparative storage device (Sample U) was obtained in the same manner as in Example 1, except that commercially available activated carbon was used in place of titanium dioxide as the negative electrode material.

Comparative Example 2

A comparative storage device (Sample V) was obtained in the same manner as in Example 1, except that the commercially available activated carbon used in Comparative Example 1 was used in place of graphite (1) as the positive electrode material.

Evaluation 1: Measurement of Specific Surface Area

The specific surface area of the positive electrode material and the negative electrode material used in Examples 1-20 and Comparative Examples 1 and 2 was measured by BET method using a specific surface area measuring apparatus (MONOSORB manufactured by Yuasa Ionics Inc.). The results are shown in Table 1.

TABLE 1

| Example | Sample | Positive electrode material Material | Specific surface area (m²/g) | Negative electrode material Material | Specific surface area (m²/g) |
|---|---|---|---|---|---|
| Example 1 | A | Graphite (1) | 20 | Anatase type TiO₂ (ST-01: Ishihara Sangyo Kaisha, Ltd.) | 314 |
| Example 2 | B | Graphite (1) | 20 | Anatase type TiO₂ (ST-21: Ishihara Sangyo Kaisha, Ltd.) | 62 |
| Example 3 | C | Graphite (1) | 20 | Anatase type TiO₂ (ST-41: Ishihara Sangyo Kaisha, Ltd.) | 10 |
| Example 4 | D | Graphite (1) | 20 | Rutile type TiO₂ (MPT-851: Ishihara Sangyo Kaisha, Ltd.) | 190 |
| Example 5 | E | Graphite (1) | 20 | Anatase type TiO₂ containing 58% rutile (PT-401M: Ishihara Sangyo Kaisha, Ltd.) | 20 |
| Example 6 | F | Graphite (1) | 20 | Anatase type flaky TiO₂ (TF-4: Ishihara Sangyo Kaisha, Ltd.) | 12 |
| Example 7 | G | Graphite (1) | 20 | Bronze type similar $H_2Ti_{22}O_{45}$ | 5 |
| Example 8 | H | Graphite (1) | 20 | Bronze type similar TiO₂ | 12 |
| Example 9 | I | Graphite (1) | 20 | Anatase type flaky TiO₂ | 127 |
| Example 10 | J | Graphite (1) | 20 | Anatase type (secondary particle) TiO₂ (ST-01: Ishihara Sangyo Kaisha, Ltd.) | 95 |
| Example 11 | K | Graphite (1) | 20 | Layered titanic acid $H_2Ti_3O_7$ | 5 |
| Example 12 | L | Graphite (1) | 20 | Layered sodium titanate $Na_2Ti_3O_7$ | 3 |
| Example 13 | M | Graphite (2) | 3 | Anatase type TiO₂ (ST-01: Ishihara Sangyo Kaisha, Ltd.) | 314 |
| Example 14 | N | Graphite (2) | 3 | Anatase type TiO₂ (ST-21: Ishihara Sangyo Kaisha, Ltd.) | 62 |
| Example 15 | O | Graphite (2) | 3 | Anatase type TiO₂ (ST-41: Ishihara Sangyo Kaisha, Ltd.) | 10 |
| Example 16 | P | Graphite (2) | 3 | Anatase type (secondary particle) TiO₂ (ST-01: Ishihara Sangyo Kaisha, Ltd.) | 95 |
| Example 17 | Q | Graphite (3) | 4 | Anatase type TiO₂ (ST-01: Ishihara Sangyo Kaisha, Ltd.) | 314 |
| Example 18 | R | Graphite (3) | 4 | Anatase type TiO₂ (ST-21: Ishihara Sangyo Kaisha, Ltd.) | 62 |
| Example 19 | S | Graphite (3) | 4 | Anatase type TiO₂ (ST-41: Ishihara Sangyo Kaisha, Ltd.) | 10 |
| Example 20 | T | Graphite (3) | 4 | Anatase type (secondary particle) TiO₂ (ST-01: Ishihara Sangyo Kaisha, Ltd.) | 95 |
| Comparative Example 1 | U | Graphite (1) | 20 | Activated carbon | 1800 |
| Comparative Example 2 | V | Activated carbon | 1800 | Anatase type TiO₂ (ST-01: Ishihara Sangyo Kaisha, Ltd.) | 314 |

Evaluation 2: Evaluation of Capacitance

Capacitance of the storage devices (Samples A-V) obtained in Examples 1-20 and Comparative Examples 1 and 2 was evaluated. Each sample was charged for 2 hours until a charging voltage of 3.5 V with setting the charging current of charger at a constant current of 0.3 mA, and then discharged at 0.3 mA until a discharging voltage of 1 V. Discharge capacitance at this time is shown in Table 2 as capacitance of samples (mAh/g (positive electrode active material)). Discharge curves of Samples A-L, N and R are shown in FIGS. 3-18. The area of the portion enclosed with discharge curve, intercept of voltage axis, intercept of capacitance axis, and origin in FIGS. 3-18 corresponds to the amount of energy of the storage device, and the larger the area, the greater the amount of energy.

TABLE 2

| Example | Sample | Capacitance (mAh/g) |
|---|---|---|
| Example 1 | A | 76.5 |
| Example 2 | B | 72.8 |
| Example 3 | C | 70.5 |
| Example 4 | D | 46.2 |
| Example 5 | E | 43.8 |
| Example 6 | F | 65.7 |
| Example 7 | G | 53.7 |
| Example 8 | H | 57.9 |
| Example 9 | I | 53.5 |
| Example 10 | J | 76.4 |
| Example 11 | K | 64.6 |
| Example 12 | L | 42.6 |
| Example 13 | M | 65.9 |
| Example 14 | N | 62.6 |
| Example 15 | O | 54.5 |
| Example 16 | P | 62.9 |
| Example 17 | Q | 67.4 |
| Example 18 | R | 64.7 |
| Example 19 | S | 56.2 |
| Example 20 | T | 64.4 |
| Comparative Example 1 | U | 46.1 |
| Comparative Example 2 | V | 26.4 |

Evaluation 3: Measurement of Cycle Performances

Cycle performances were evaluated on storage devices obtained in Examples 1-12 (Samples A-L). With setting the charging and discharging current at 0.3 mA, each storage device was subjected to constant current charging at 3.3 V, and thereafter was subjected to discharging until 1.0 V in the same manner, and 30 cycles of this charge and discharge cycle were repeated. Charge and discharge capacitances at second cycle and 30th cycle were measured, and the cycle performances were obtained by the formula: (capacitance at 30th cycle/capacitance at second cycle)×100. The results are shown in Table 3. Furthermore, change of capacitance retention rate in Example 1 is shown in FIG. 19.

TABLE 3

| Example | Sample | Capacitance (mAh/g) Second cycle | 30th cycle | Cycle performances |
|---|---|---|---|---|
| Example 1 | A | 46.9 | 45.0 | 95.9 |
| Example 2 | B | 43.7 | 38.3 | 87.6 |
| Example 3 | C | 43.3 | 43.5 | 100.5 |
| Example 4 | D | 39.7 | 40.5 | 102.0 |
| Example 5 | E | 43.6 | 40.5 | 92.9 |
| Example 6 | F | 43.6 | 42.0 | 96.3 |
| Example 7 | G | 32.5 | 18.2 | 56.0 |
| Example 8 | H | 38.8 | 33.0 | 85.1 |
| Example 9 | I | 40.9 | 45.0 | 110.0 |
| Example 10 | J | 45.6 | 43.6 | 95.6 |
| Example 11 | K | 54.0 | 54.3 | 100.6 |
| Example 12 | L | 28.5 | 27.9 | 97.6 |

Evaluation 4: Evaluation of Rate Performances

Rate performances were evaluated on storage devices obtained in Examples 1, 2, 4, 7, 9 and 10 (Samples A, B, D, G, I and J). The storage devices were subjected to charging and discharging with setting the voltage range at 1.0-3.3 V, the charging current at 40 mA/g, and the discharging current at 40-1600 mA/g to measure the discharge capacitance of the storage devices. The capacitance retention rate was calculated by the formula $(X_n/X_1) \times 100$ where $X_1$ is the measured value of discharge capacitance at 40 mA/g and $X_n$ is the measured value in the range of 80-1600 mA/g. The results are shown in Table 4. It can be seen from the results that even when the current amount was increased, the rate performances were excellent if the capacitance retention rate was high.

TABLE 4

| | | Capacitance retention rate (%) | | | | |
|---|---|---|---|---|---|---|
| Example | Sample | 80 mA/g | 160 mA/g | 320 mA/g | 800 mA/g | 1600 mA/g |
| Example 1 | A | 99.1 | 98.5 | 97.3 | 93.1 | 86.0 |
| Example 2 | B | 97.1 | 94.2 | 92.4 | 91.7 | 61.6 |
| Example 4 | D | 98.1 | 95.1 | 92.1 | 85.8 | 75.2 |
| Example 7 | G | 95.2 | 90.0 | 83.2 | 68.9 | 52.8 |
| Example 9 | I | 96.7 | 92.1 | 86.6 | 81.4 | 62.7 |
| Example 10 | J | 101.7 | 102.7 | 101.0 | 95.8 | 89.3 |

Example 21

(Production of Positive Electrode)

3 g of graphite (1) used in Example 1 and 1 g of a mixed powder of acetylene black and polytetrafluoroethylene (TAB) were kneaded using an agate mortar. The kneaded product was press bonded onto an aluminum base and a circle of 12 mm in diameter was punched out therefrom to obtain a positive electrode (2) having 10 mg of an active material and a thickness of about 0.1 mm.

(Production of Negative Electrode)

3 g of anatase type titanium oxide having a specific surface area of 314 $m^2/g$ used in Example 1 and 1 g of TAB were kneaded using an agate mortar. The kneaded product was press bonded onto an aluminum base and a circle of 12 mm in diameter was punched out therefrom to obtain a negative electrode (2) having 10 mg of an active material and a thickness of about 0.1 mm.

(Fabrication of Storage Device)

A storage device of the present invention (Sample A') was obtained in the same manner as in Example 1, except that positive electrode (1) and negative electrode (1) were replaced with positive electrode (2) and negative electrode (2), respectively.

Examples 22-29

Storage devices of the present invention (Samples B'-I') were obtained in the same manner as in Example 21, except that titanium oxides shown in Table 5 were used in place of the anatase type titanium oxide having a specific surface area of 314 $m^2/g$.

Evaluation 5: Measurement of Specific Surface Area

The specific surface area of titanium oxides used in Examples 21-29 was measured in the same manner as in evaluation 1. The results are shown in Table 5.

TABLE 5

| Example | Sample | Positive electrode material | Negative electrode Material | Specific surface area ($m^2/g$) |
|---|---|---|---|---|
| Example 21 | A' | Graphite (1) | Anatase type $TiO_2$ (ST-01: Ishihara Sangyo Kaisha, Ltd.) | 314 |
| Example 22 | B' | Graphite (1) | Anatase type $TiO_2$ (ST-21: Ishihara Sangyo Kaisha, Ltd.) | 62 |
| Example 23 | C' | Graphite (1) | Anatase type $TiO_2$ (ST-41: Ishihara Sangyo Kaisha, Ltd.) | 10 |
| Example 24 | D' | Graphite (1) | Anatase type $TiO_2$ (PT-501A: Ishihara Sangyo Kaisha, Ltd.) | 17 |
| Example 25 | E' | Graphite (1) | Rutile type $TiO_2$ (CR-EL: Ishihara Sangyo Kaisha, Ltd.) | 7 |
| Example 26 | F' | Graphite (1) | Rutile type $TiO_2$ (MPT-851: Ishihara Sangyo Kaisha, Ltd.) | 190 |
| Example 27 | G' | Graphite (1) | Rutile type $TiO_2$ (TTO-55N: Ishihara Sangyo Kaisha, Ltd.) | 42 |
| Example 28 | H' | Graphite (1) | Rutile type $TiO_2$ (TTO-55A: Ishihara Sangyo Kaisha, Ltd.) | 40 |
| Example 29 | I' | Graphite (1) | Anatase type $TiO_2$ containing 58% rutile (PT-401M: Ishihara Sangyo Kaisha, Ltd.) | 20 |

Evaluation 6: Evaluation of Capacitance

The capacitance of the storage devices obtained in Examples 21-29 (Samples A'-I') was evaluated. Constant charging current of 1 mA was applied to the storage devices of Samples A'-I', followed by changing to constant voltage at the point of time of reaching 3.5 V and carrying out charging of 2 hours in total, and then carrying out discharging until 0 V at 1 mA. The discharge capacitance in this case is shown in Table 6 as capacitance (mAh/g (positive electrode active material) of the samples.

TABLE 6

| Example | Sample | Capacitance (mAh/g) |
|---|---|---|
| Example 21 | A' | 62 |
| Example 22 | B' | 72 |
| Example 23 | C' | 68 |
| Example 24 | D' | 71 |
| Example 25 | E' | 24 |
| Example 26 | F' | 50 |
| Example 27 | G' | 35 |
| Example 28 | H' | 33 |
| Example 29 | I' | 44 |

The storage devices of the present invention had high capacitance. Moreover, as can be seen from comparison of Examples 4, 5 and 12 with Comparative Example 1, in the present invention, even those which were not so high in capacitance were high in discharge capacitance, and hence large in amount of energy. Therefore, high energy density can be attained. Furthermore, they were also excellent in cycle performances and rate performances.

INDUSTRIAL APPLICABILITY

The storage devices of the present invention are useful as electric sources for mobiles such as electric cars, power storage systems for electric enterprise, etc.

Figure 1:
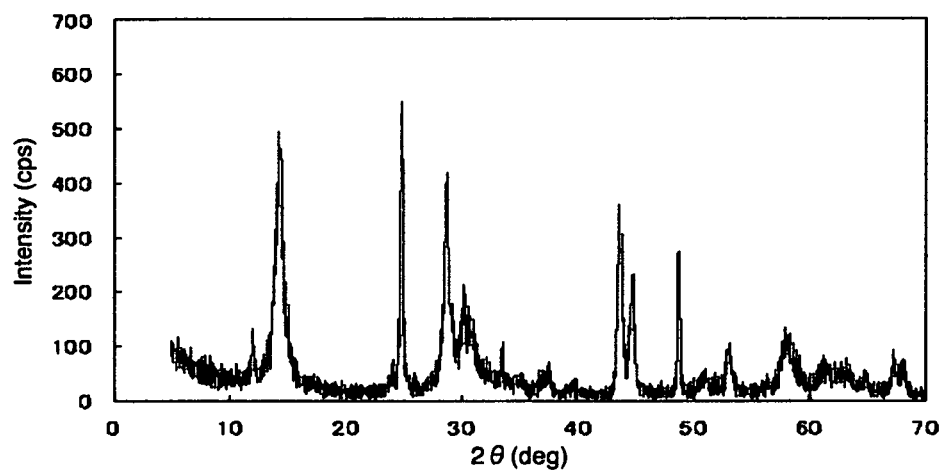
FIG. 1 An X-ray diffraction chart of the titanium oxide obtained in Example 7 (Sample g)
Figure 2:
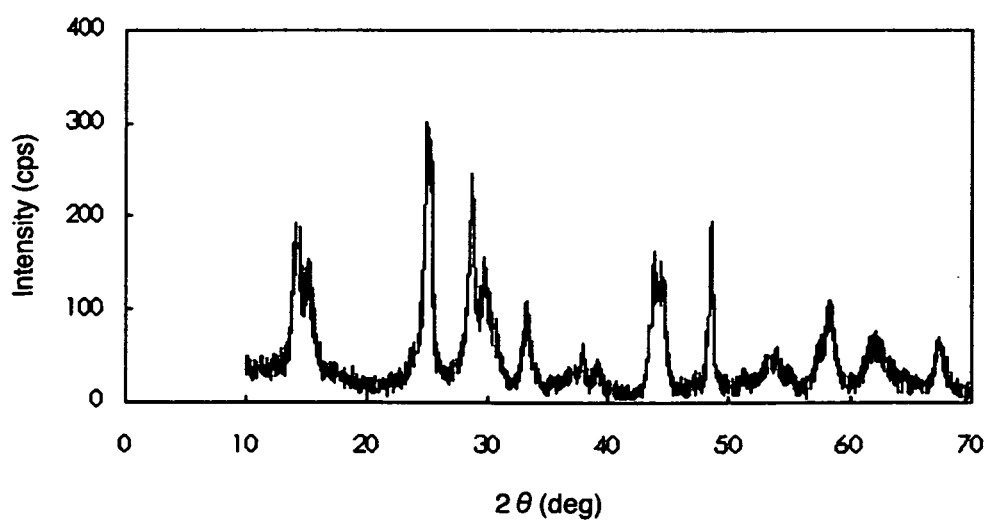
FIG. 2 An X-ray diffraction chart of the titanium oxide obtained in Example 8 (Sample h)
Figure 3:
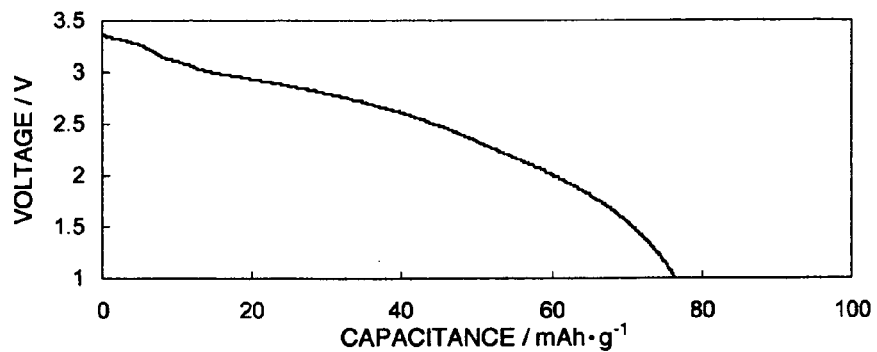
FIG. 3 A graph showing discharge curve of the storage device obtained in Example 1 (Sample A)
Figure 4:
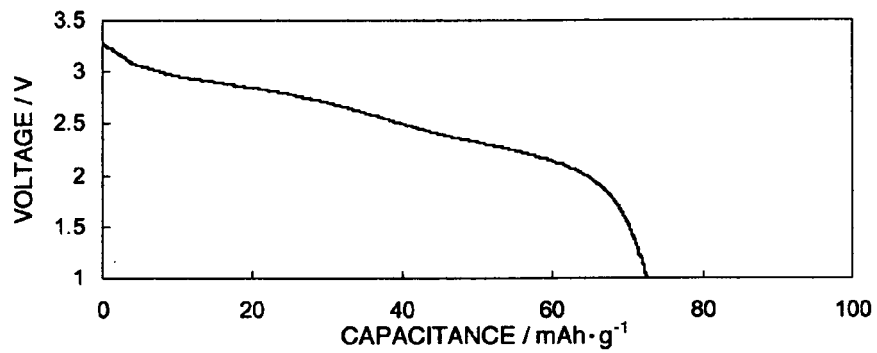
FIG. 4 A graph showing discharge curve of the storage device obtained in Example 2 (Sample B)
Figure 5:
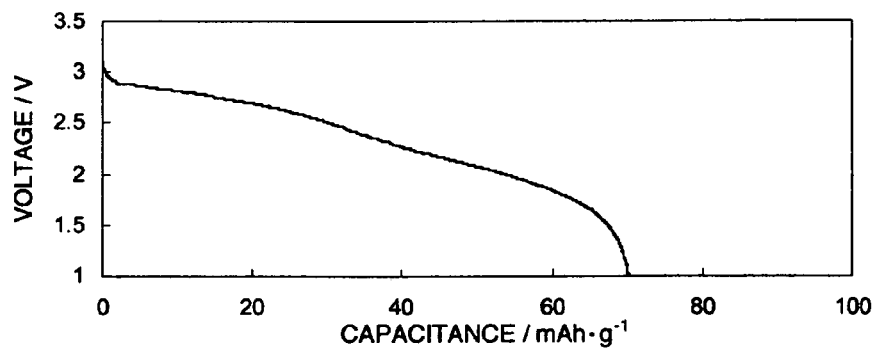
FIG. 5 A graph showing discharge curve of the storage device obtained in Example 3 (Sample C)
Figure 6:
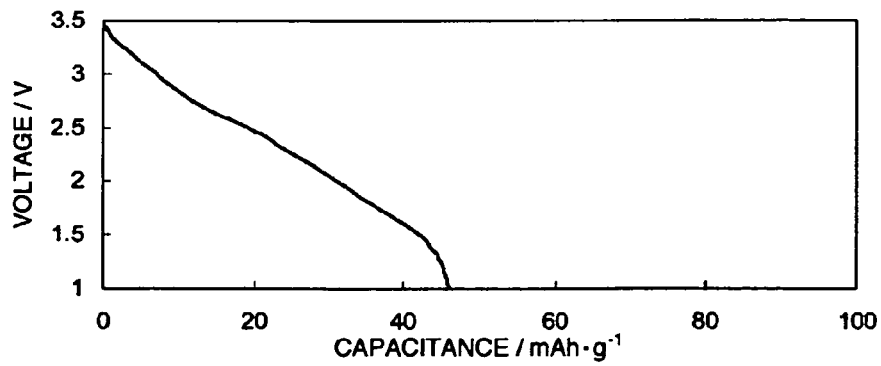
FIG. 6 A graph showing discharge curve of the storage device obtained in Example 4 (Sample D)
Figure 7:
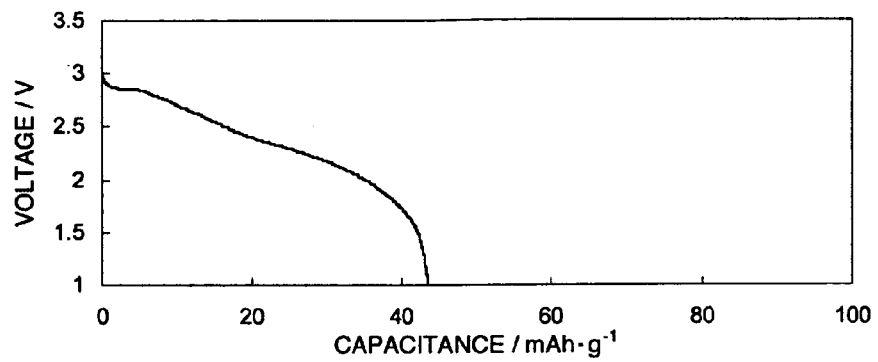
FIG. 7 A graph showing discharge curve of the storage device obtained in Example 5 (Sample E)
Figure 8:
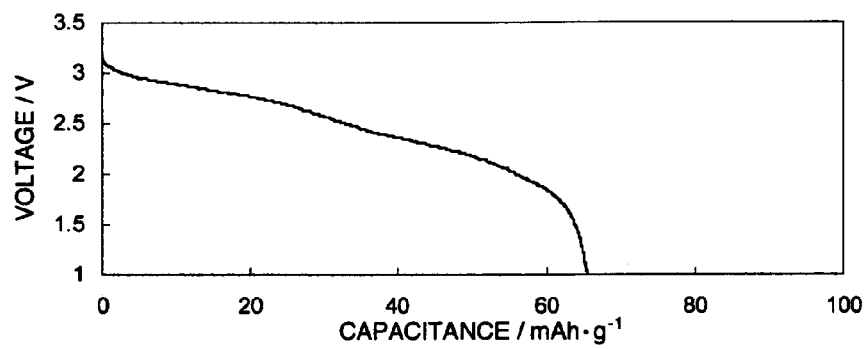
FIG. 8 A graph showing discharge curve of the storage device obtained in Example 6 (Sample F)
Figure 9:
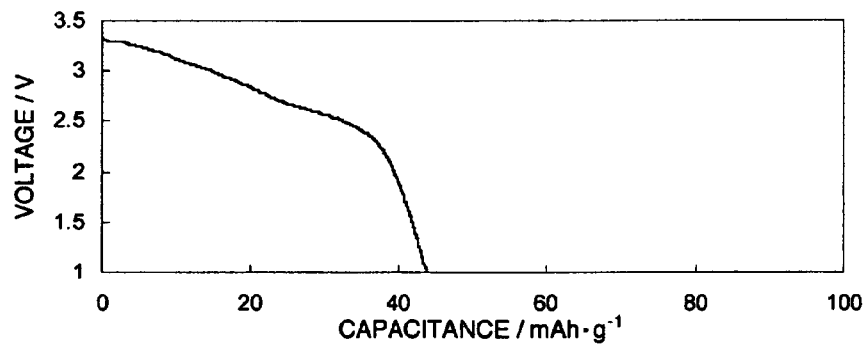
FIG. 9 A graph showing discharge curve of the storage device obtained in Example 7 (Sample G)
Figure 10:
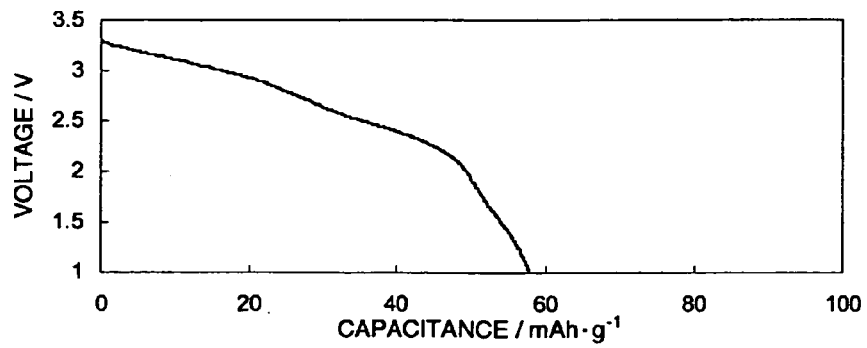
FIG. 10 A graph showing discharge curve of the storage device obtained in Example 8 (Sample H)
Figure 11:
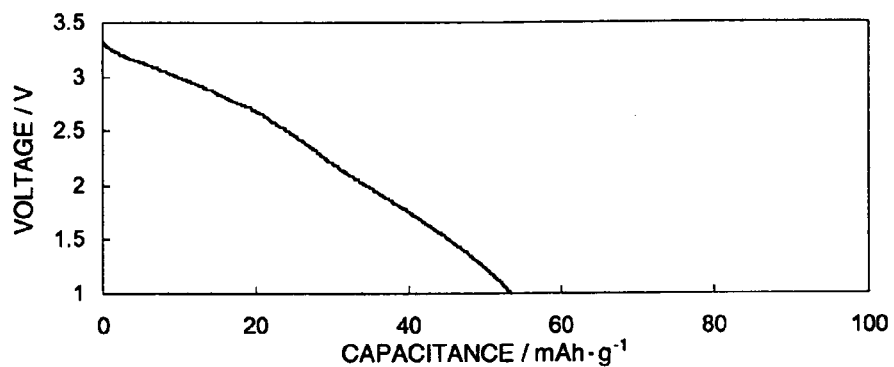
FIG. 11 A graph showing discharge curve of the storage device obtained in Example 9 (Sample I)
Figure 12:
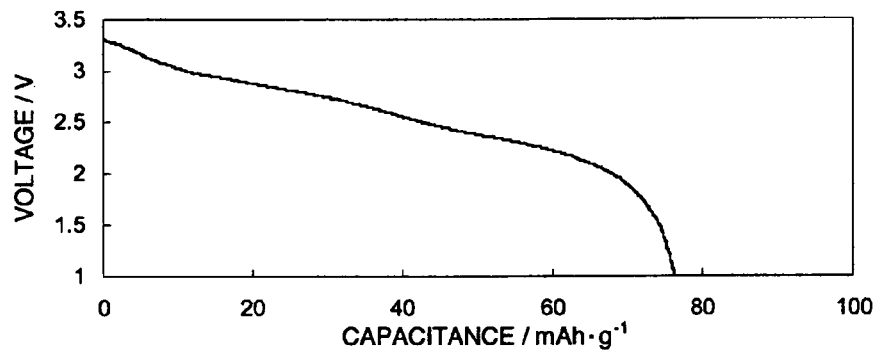
FIG. 12 A graph showing discharge curve of the storage device obtained in Example 10 (Sample J)
Figure 13:
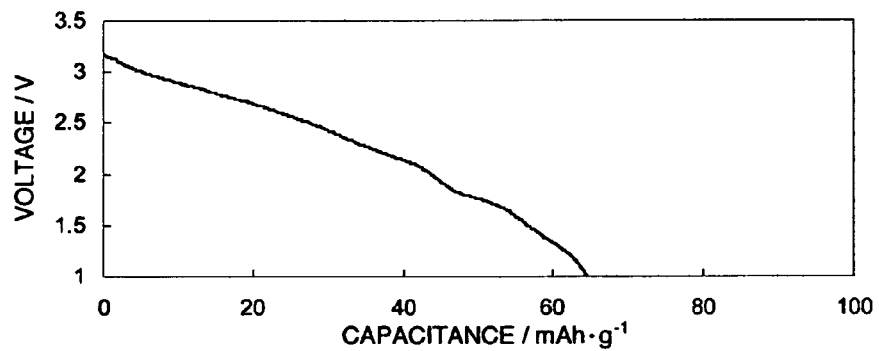
FIG. 13 A graph showing discharge curve of the storage device obtained in Example 11 (Sample K)
Figure 14:
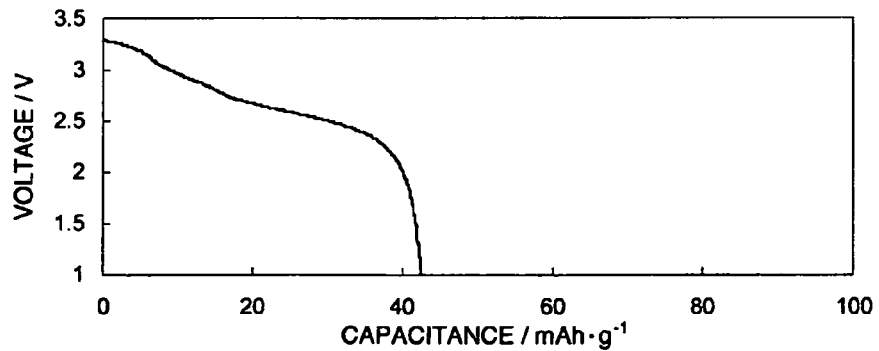
FIG. 14 A graph showing discharge curve of the storage device obtained in Example 12 (Sample L)
Figure 15:
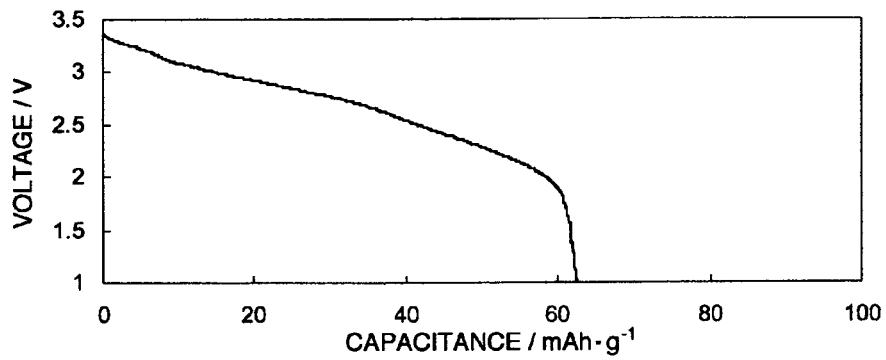
FIG. 15 A graph showing discharge curve of the storage device obtained in Example 14 (Sample N)
Figure 16:
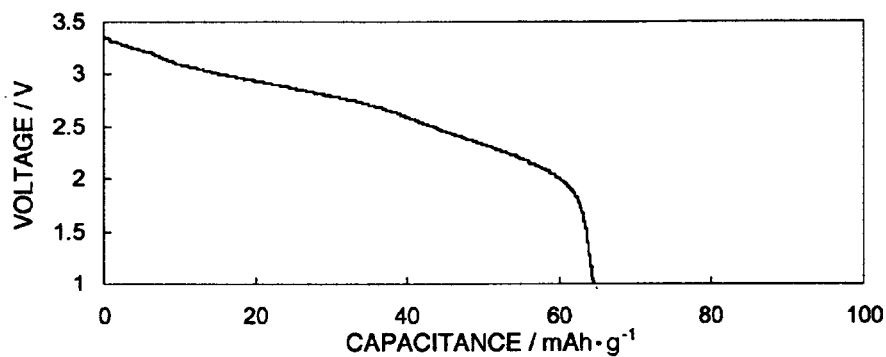
FIG. 16 A graph showing discharge curve of the storage device obtained in Example 18 (Sample R)
Figure 17:
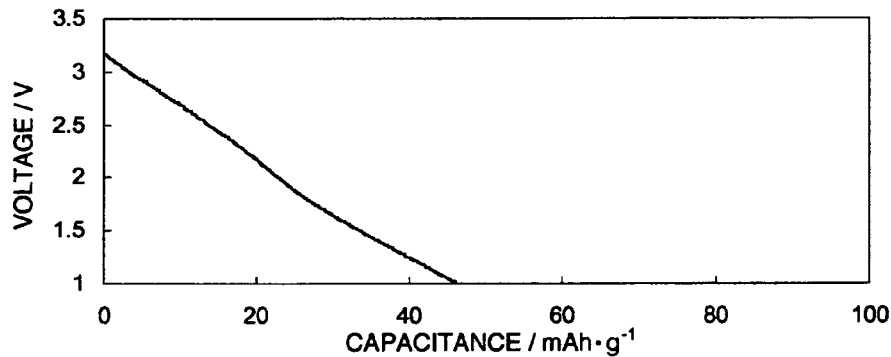
FIG. 17 A graph showing discharge curve of the storage device obtained in Comparative Example 1 (Sample U)
Figure 18:
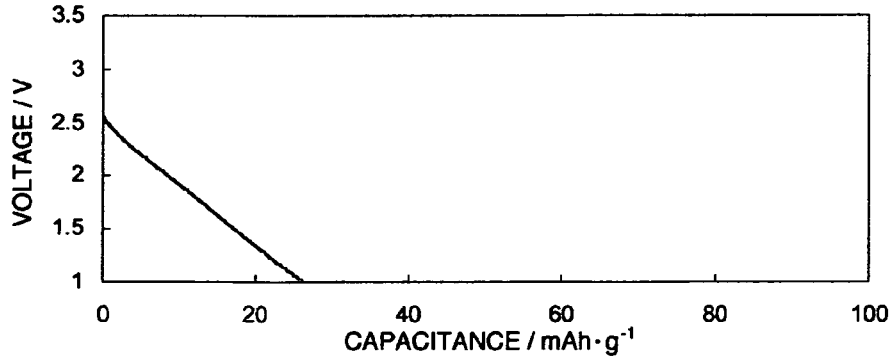
FIG. 18 A graph showing discharge curve of the storage device obtained in Comparative Example 2 (Sample V)
Figure 19:
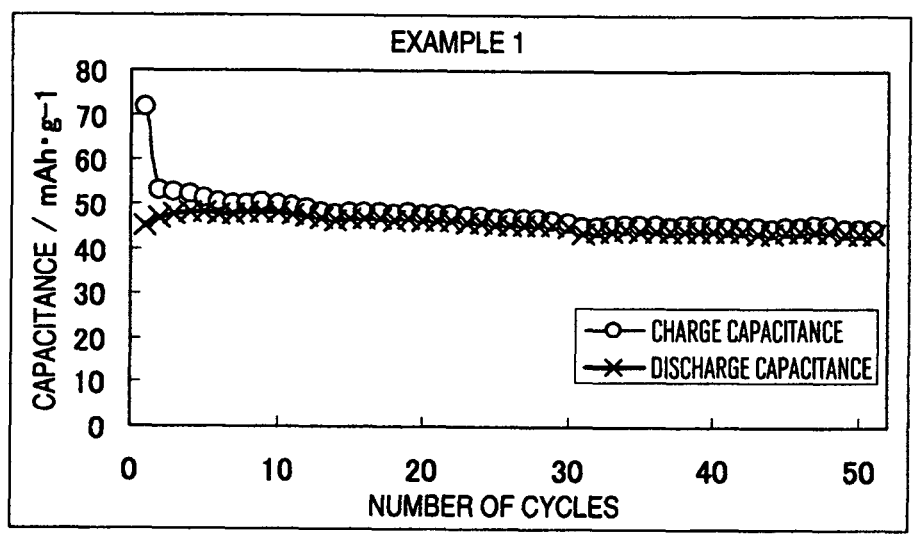
FIG. 19 A graph showing cycle performances of the storage device obtained in Example 1 (Sample A)

The invention claimed is:

1. A storage device which comprises
a positive electrode material containing graphite of 50 wt. % or more of the total composition of the positive electrode,
a negative electrode material containing (i) an active material consisting essentially of a metal oxide containing at least titanium as a metal element, and (ii) a conductive material of less than 50 wt. % of the total composition of the negative electrode, and
an electrolyte.

2. A storage device according to claim 1, wherein the metal oxide, containing at least titanium as a metal element is a titanium oxide.

3. A storage device according to claim 2, wherein the crystal form of the titanium oxide is anatase type and/or rutile type.

4. A storage device according to claim 2, wherein the titanium oxide is obtained by heating a layered titanic acid compound.

5. A storage device according to claim 2, wherein the titanium oxide is secondary particles which is an aggregate of primary particles.

6. A storage device according to claim 2, wherein the titanium oxide has a specific surface area of 0.1-500 m²/g.

7. A storage device according to claim 2, wherein the titanium oxide has a flaky particle shape.

8. A storage device according to claim 1, wherein the metal oxide is a composite oxide of titanium and an alkali metal or an alkaline earth metal element.

9. A storage device according to claim 1, wherein the graphite has a specific surface area of 0.5-300 m²/g.

10. A storage device according to claim 1, wherein the electrolyte contains a non-aqueous solvent and a lithium salt.

11. A storage device which comprises
a positive electrode material containing graphite of 50 wt. % or more of the total composition of the positive electrode,
a negative electrode material containing (i) an active material consisting essentially of anatase titanium dioxide, and (ii) a conductive material of less than 50 wt. % of the total composition of the negative electrode, and
an electrolyte.

12. A storage device according to claim 11, wherein the titanium dioxide is obtained by heating a layered titanic acid compound.

13. A storage device according to claim 11, wherein the titanium dioxide is secondary particles which is an aggregate of primary particles.

14. A storage device according to claim 11, wherein the titanium oxide has a specific surface area of 0.1-500 m²/g.

15. A storage device which comprises
a positive electrode material containing graphite of 50 wt. % or more of the total composition of the positive electrode,
a negative electrode material containing (i) a metal oxide containing at least titanium as a metal element, and (ii) a conductive material of less than 50 wt. % of the total composition of the negative electrode, and
an electrolyte, wherein said negative electrode material does not contain an active carbon material.

16. A storage device according to claim 15, wherein the metal oxide, containing at least titanium as a metal element is a titanium oxide.

17. A storage device according to claim 16, wherein the crystal form of the titanium oxide is anatase type and/or rutile type.

18. A storage device which comprises
a positive electrode material containing graphite of 50 wt. % or more of the total composition of the positive electrode,
a negative electrode material containing a metal oxide containing at least titanium as a metal element of 50 wt. % or more of the total composition of the negative electrode, and
an electrolyte, wherein the storage device is a hybrid capacitor, and
the negative electrode material does not contain an active carbon material.

19. A storage device according to claim 18, wherein the metal oxide, containing at least titanium as a metal element is a titanium oxide.

20. A storage device according to claim 19, wherein the crystal form of the titanium oxide is anatase type and/or rutile type.

* * * * *